Dec. 18, 1962  C. R. JOHNSTON  3,068,598
PORTABLE TIE PRESS
Filed Oct. 30, 1961  2 Sheets-Sheet 1
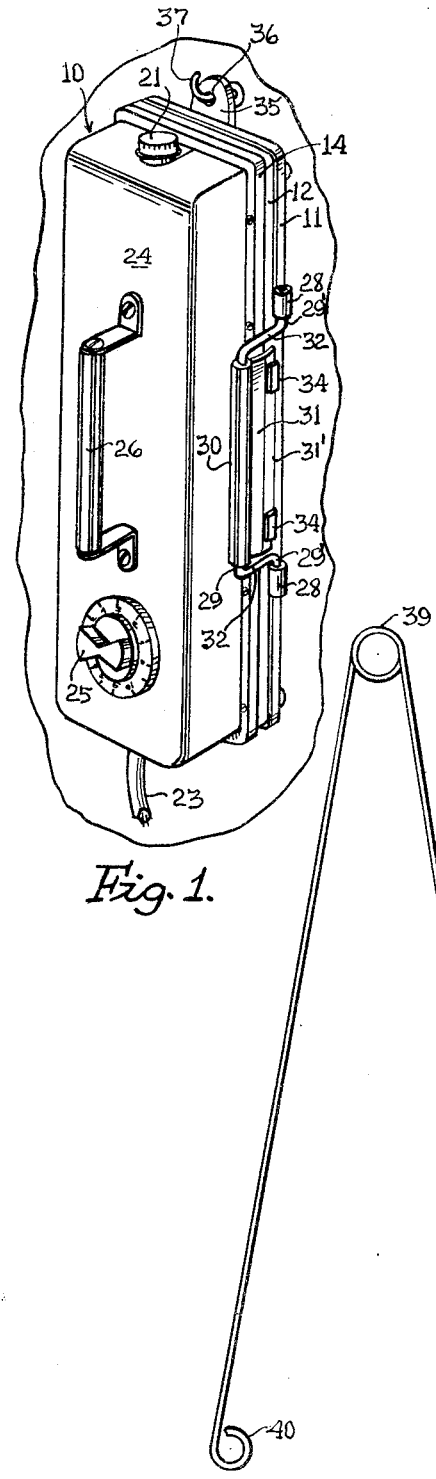
Fig. 1.
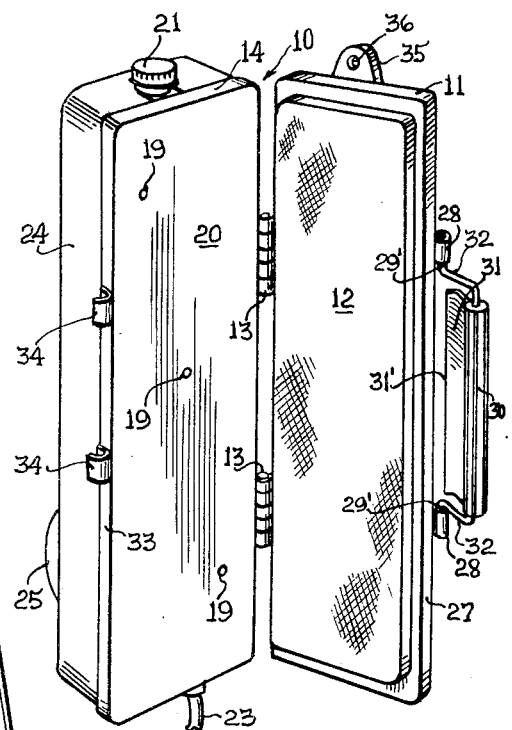
Fig. 2.
Fig. 3.
INVENTOR.
CHARLES RICHARD JOHNSTON
BY Threedy & Threedy
HIS ATTORNEYS Dec. 18, 1962 — C. R. JOHNSTON — 3,068,598
PORTABLE TIE PRESS
Filed Oct. 30, 1961 — 2 Sheets-Sheet 2

INVENTOR.
CHARLES RICHARD JOHNSTON
BY Threedy & Threedy
HIS ATTORNEYS.

United States Patent Office 3,068,598
Patented Dec. 18, 1962

3,068,598
PORTABLE TIE PRESS
Charles Richard Johnston, 80 E. Jackson Blvd.,
Chicago, Ill.
Filed Oct. 30, 1961, Ser. No. 148,664
2 Claims. (Cl. 38—71)

My invention relates to a new and useful improvement in a portable tie press and more particularly to a steam press for pressing an article of apparel in the form of a tie.

An object of this invention is in the provision in a device of this character of a means for generating a necessary amount of steam in a press for a single pressing operation of a determinable duration.

Another object of my invention is in the provision in a device of this character of a means for electrically operating a steam producing press.

Yet another important object of my invention is in the provision in a device of this character of a manually operated selective timing control for operating the same.

A still further object of my invention is in the provision in a device of this character of a fluid container associated with an electrical heating element which together cooperate to produce a determinable amount of steam; and which fluid container provides suitable steam exhaust ports through which, and over a desired area, steam is introduced on to the article to be pressed.

Yet another important object of my invention is in the provision in a device of this character of a releasable latch for locking the hinged pressing sections together in pressing relation.

Other objects will appear hereinafter.

The invention consists in the novel combination and arrangement of parts to be hereinafter described and claimed.

The invention will be best understood by references to the accompanying drawings showing the preferred form of construction, and in which:

FIG. 1 is a perspective view of my portable electrically operated tie press.

FIG. 2 is a perspective view of the same in open condition.

FIG. 3 is a plan view of a tie holder to be used in conjunction with the tie press as shown in FIGS. 1 and 2.

Figure 4:
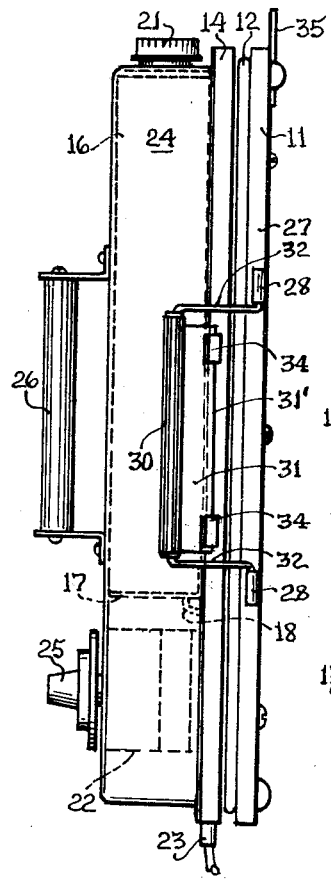
FIG. 4 is a side elevational view of my invention.

My invention relates to an electrically operated device for steam pressing an article of apparel, namely; a man's tie. The press 10 comprises a presser plate 11 upon one face of which is carried a pad 12 of absorbent material, such as felt or the like. Hinged as at 13 along one longitudinal edge of the presser plate 11 is a hollow front plate 14. Within this front plate 14 is a series of heating coils 15 of any well known construction.

Figure 5:
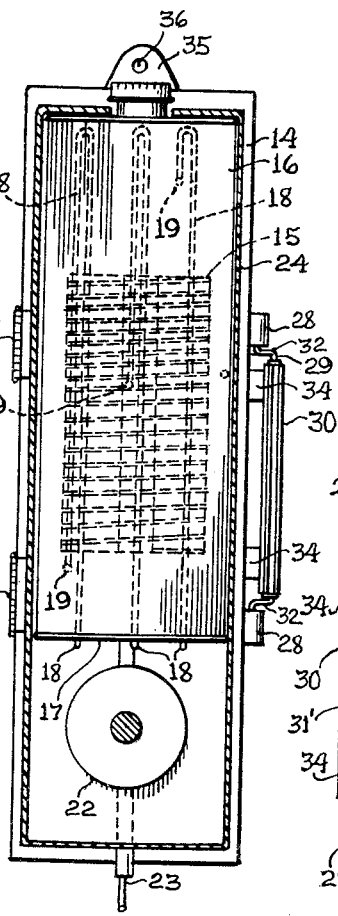
FIG. 5 is a front elevational sectional detailed view of my invention.
Figure 8:
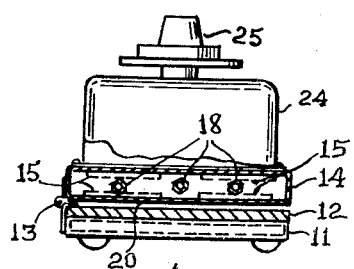

Mounted on the outer or exposed face of the front plate is a fluid reservoir tank 16. Extending from the bottom wall 17 of the tank 16 is a plurality of conduits 18. These conduits 18 extend from the bottom of the tank 16 into the hollow front plate 14 and lie in close proximity with respect to the heating coils 15, as seen in FIGS. 5 and 8. Each of the conduits 18 extend substantially throughout the longitudinal length of the front plate 14. The conduits extend upwardly from the bottom wall 17 of the tank to the top plane of such tank and thereupon reverse themselves and are directed downwardly until each terminate into a separate spaced apart exhaust port 19, formed in the rear wall 20 of the front plate 14 as seen in FIG. 2. The tank 16 is provided with a removable cap 21 which permits the filling of the same with a suitable fluid.

The heating coils 15 are associated with a timing control 22 of any well-known construction. This timing control is connected to an electrical cord 23 which is utilized to supply the necessary electrical current to the steam press.

The tank 16 as well as the timing control 22 is encased within a cover 24. The timing control 22 is provided with a manually operated control knob 25 which extends exteriorly of the cover 24 as seen in FIGS. 1, 4, 5, and 8. The cover 24 is provided with a suitable handle 26 which facilitates separating the hinged presser plate 11 and front plate 14.

The presser plate 11 along its longitudinal edge 27 is provided with two spaced apart trunnions 28 through which are pivotally journaled the oppositely extending ends 29' of a yokelike rod 29 carrying upon its bight portion a latch member 30. The latch member 30 provides an integral latch finger 31 which extends therefrom between opposite arms 32 of such rod 29.

Figure 7:
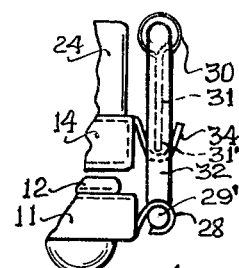
FIG. 7 is a fragmentary end view of the releasable latch associated with my invention and FIG. 8 is an end sectional detailed view of my improved tie press.
Figure 6:
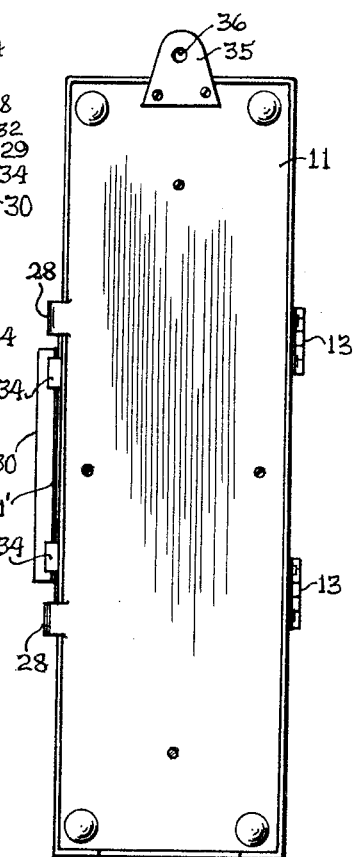
FIG. 6 is a rear elevational view of my invention.

The front plate 14 along one longitudinal edge 33 provides two spaced apart U-shaped clamps 34. These U-shaped clamps 34 are adapted to receive the longitudinal edge 31 of the latch finger 31 as seen in FIG. 7. By this arrangement, when the latch finger 31 is pivoted into the position shown in FIGS. 1, 4 and 7, it will bear the front plate 14 upon the pad 12 of the presser plate 11 in a pressing relation.

The presser plate 11 provides a hanger plate 35 provided with an aperture 36 whereby the press may be removably hung in a vertical position upon a wall hook 37 or the like, as shown in FIG. 1.

In FIG. 3 I show a tie holder 38 made from a single piece of wire or the like. The tie holder 38 is substantially of a V-formation and is provided with a coiled end 39 which permits the free ends 40 thereof to be yieldably positioned with respect to each other.

In operation, the tie to be pressed will have the tie holder inserted therein. The tie holder and tie will be placed upon the pad 12 carried by the presser plate 11. The front plate will be closed thereon and the latch 30 will releasably lock the same in a pressing relation. The fluid reservoir tank 16 will have been filled with a suitable fluid and the manual control of the timer 25 will be actuated to the desired position indicating the duration of the pressing operation. With the actuation of the timer 25, the heating coils 15 receive the electric current therein and will cause the fluid in the conduits 18 to become steam and escape through the exhaust ports 19 and onto the tie to be pressed. As the tie press 10 is positioned in a vertical plane during operation as seen in FIG. 1, the fluid in the conduits 18 will be maintained at the same level as the fluid in the reservoir tank 16, and thus assure a full and proper amount of steam to be channeled during the pressing operation.

While I have illustrated and described the preferred form of construction for carrying my invention into effect, this is capable of variation and modification without departing from the spirit of the invention. I therefore do not wish to be limited to the precise details of construction set forth but desire to avail myself of such variations and modifications as come within the scope of the appended claims.

What is claimed is:

1. An electrically operated portable tie press comprising an elongated flat presser plate and a hollow heating plate hinged together along one longitudinal edge, means for hingedly connecting said presser plate to said heating plate, a fluid reservoir carried by one side wall of said heating plate, heating means within said hollow heating plate, said reservoir having fluid conduits extending from the bottom portion thereof into and substantially throughout the longitudinal length of said hollow heating plate and in juxtaposition with respect to said heating means, said conduits provided with exhaust ports having open communication through the other side wall of said heating plate with said presser plate, a means for controlling the operation of said heating means whereby said means will convert the fluid in said conduits into steam causing the same to move therethrough and to be exhausted through said ports on to said presser plate, and a latch for releasably locking the presser plate and heating plate in facial abutment.

2. A portable tie press comprising an elongated flat presser plate and a hollow heating plate hinged together along one longitudinal edge, means for hingedly connecting said presser plate to said heating plate, a fluid reservoir carried by one side wall of said heating plate, electric heating coils within said hollow heating plate, said reservoir having fluid conduits extending from the bottom portion thereof into and substantially throughout the longitudinal length of said hollow heating plate and in juxtaposition with respect to said heating coils, said conduits provided with exhaust ports having open communication through the other side wall of said heating plate with said presser plate, a timing member for controlling the operation of said electric coils whereby said coils will convert the fluid in said conduits into steam causing the same to move therethrough and to be exhausted through said ports on to said presser plate.

References Cited in the file of this patent

UNITED STATES PATENTS

| | | |
|---|---|---|
| 1,498,654 | Hauptman | June 24, 1924 |
| 1,950,498 | Lehnen et al. | Mar. 13, 1934 |
| 2,292,380 | Kersten | Aug. 11, 1942 |
| 2,606,275 | Jacowitz | Aug. 5, 1952 |
| 2,647,664 | Palmatier et al. | Aug. 4, 1953 |